United States Patent [19]

Williams

[11] Patent Number: 5,276,529
[45] Date of Patent: Jan. 4, 1994

[54] SYSTEM AND METHOD FOR REMOTE TESTING AND PROTOCOL ANALYSIS OF COMMUNICATION LINES

[75] Inventor: Clifton B. Williams, Richmond, Va.

[73] Assignee: C & P of Virginia, Richmond, Va.

[21] Appl. No.: 646,319

[22] Filed: Jan. 28, 1991

[51] Int. Cl.$^5$ ............................................. H04N 1/32
[52] U.S. Cl. ............................................. 358/406
[58] Field of Search ............ 358/400, 402, 404, 406, 358/408, 435, 437, 440, 442; 379/100; H04N 400

[56] References Cited

U.S. PATENT DOCUMENTS

| | | | |
|---|---|---|---|
| 4,156,798 | 5/1979 | Doelz | 358/408 |
| 4,967,288 | 10/1990 | Mizutori et al. | 358/404 |
| 4,974,254 | 11/1990 | Perine et al. | 358/435 |
| 5,061,916 | 10/1991 | French et al. | 358/400 |

Primary Examiner—Stephen Brinich
Attorney, Agent, or Firm—Lowe, Price, LeBlanc & Becker

[57] ABSTRACT

Protocol analysis circuitry is provided at a site at which a plurality of private line data circuits are interconnected with one or more trunk lines. The analysis circuitry is wired into each of the data circuits and trunk lines through appropriate jacks on a continuous long-term basis. A programmed personal computer is installed at the site for control of the analysis circuitry and selection of the circuit to be tested. Monitored data and analysis data can be stored in computer memory. Telephone access to the test site permits interaction between the site computer and a distant computer located, for example at a maintenance facility. Selection of the circuit to be tested and definition of network parameters to be measured can, therefore, be done remotely. The on site computer is provided with facsimile format capability so that stored data automatically can be communicated from the test site, through a telephone line, to a facsimile machine at the remote facility.

32 Claims, 4 Drawing Sheets

SYSTEM AND METHOD FOR REMOTE TESTING AND PROTOCOL ANALYSIS OF COMMUNICATION LINES

CROSS-REFERENCE TO RELATED APPLICATIONS

This application is related to copending applications by the same inventor, Ser. No. 07/394,090 (U.S. Pat. No. 4,998,240), filed Aug. 15, 1989 and Ser. No. 07/515,007 (U.S. Pat. No. 5,189,663), filed Apr. 26, 1990 and commonly assigned with the present invention.

TECHNICAL FIELD

The present invention relates generally to remote testing of a plurality of communication lines, and more particularly to the remote and unattended protocol analysis of a private line data network.

BACKGROUND ART

Large private data line networks which extend over a vast geographic area have become commonplace in environments requiring communication between a host computer located, for example, at the headquarters in one city and a multitude of data circuits concentrated in branch locations in other cities or remote areas. A typical example would be a large bank having branch offices and ATM machines at various remote locations. Other applications would include stock market quotation networks, airline reservation systems, tickets sales systems and large military installations.

Rather than running an individual line to each of the terminal locations, a high speed trunk line, comprising one or more individual lines, is used to serve data between the host computer and the various locations. A packet assembler and disassembler (PAD) is provided at a concentration of data circuits in a remote location. The PAD reroutes data packages from the high speed trunk line to the various local data circuits in accordance with addresses included in the data packets. Various standard interfaces are available including, for example, RS232, V.35 and T1.

Such large data networks require testing in the event of system troubles. Users often provide their own network operations centers and maintenance personnel to perform testing, monitoring and analysis. Circuit continuity checks can be done remotely and remote bit error rate testing provides the ability to loop back an individual circuit to see the error rate at which data that is sent out is received back correctly. While these test procedures determine whether data can be accurately transmitted, they do not enable monitoring and analyzing data actually transmitted during use. The transmission of the data may be performed flawlessly but if improper data is applied to the communication line such defect is not detected.

There is an extensive variety of problems which are not capable of diagnosis in such a testing environment. For example, a polling operation may not be functioning properly because the polled station address is incorrectly stored in the host computer memory or because there is a change or defect in the host software. As another example, communication may not be established because improper input data has been applied in a log in procedure. Another common problem that would not be discerned is the generation of erroneous data from a "streaming terminal." Such generation occurs when a data input key malfunctions or is continuously depressed.

Conventional systems do not have the ability remotely to analyze data link protocols and to perform network analysis, such as defined by the International Standards Organization as OSI model levels 2 and 3. That is, problems such as those just discussed are not diagnosed remotely. If protocol analysis or other diagnostics are to be performed, a technician must be dispatched with a portable protocol analyzer to several points along the circuit.

Use of the portable analyzer involves identification and selection of the line to be accessed, disconnection of the line, followed by reconnection with the analyzer inserted in circuit to perform analysis functions, and again disconnection to remove the analyzer from the circuit. The intrusive nature of this use, as well as the demands on the technician's time, are significant disadvantages of conventional practice. The results of the on site monitoring and collection of data often require more detailed analysis at the maintenance facility. Conveyance of such information to the facility in a timely manner may be costly and inconvenient.

These drawbacks are multiplied when a circuit exhibits a recurring problem that requires extended attention. For example, in a case of network administration, a circuit may be seen to malfunction frequently at the same time of day. A technician would have to personally attend the local site each day at the same time until the problem is diagnosed or, alternatively, remain at the site during the entire time. As an operating technician is required to be at the testing site, cost considerations restrict use to short, noncontinuous periods. Testing is normally done either on a routine basis or after indentification of the existence of a problem whose exact nature is not yet known. Conventional protocol analysis is therefore limited in that it can not practically be used to monitor the data stream of a selected circuit continuously over an extended period of time. Without such use, there is no pragmatic way to detect the occurrence of a predefined condition and to initiate a control function upon recognition of such occurrence.

DISCLOSURE OF THE INVENTION

Accordingly, an object of the invention is to control protocol and network analysis of a plurality of private user communication lines from a remote location.

Another object of the invention is to designate, from a remote location, one of a plurality of user communication lines to be accessed for protocol analysis.

Another object of the invention is to perform protocol analysis without requiring the presence of an operating technician at the analysis site.

A further object of the invention is to perform remote and unattended protocol analysis and to provide for automatic transmission of monitored or analyzed data to a remote location at predefined times.

Another object of the invention is to provide nonintrusive, continuous monitoring and storage of analysis data with the ability to automatically transmit the data to a specified remote location at specified times.

Yet another object of the invention is to provide the ability to define, from a remote location, a network transmission condition the occurrence of which will be automatically detected and, in response to such detection, to automatically initiate a control function.

The above objects and other objects of the invention are satisfied, at least in part, by providing protocol analysis circuitry at a site at which a plurality of private line data circuits are interconnected with one or more trunk lines. The analysis circuitry is wired into each of the data circuits and trunk lines through appropriate jacks on a continuous long-term basis. A programmed personal computer is installed at the site for control of the analysis circuitry and selection of the circuit to be tested. Monitored data and analysis data can be stored in computer memory.

Telephone access to the test site permits interaction between the site computer and a distant computer located, for example, at a maintenance facility. Selection of the circuit to be tested and definition of network parameters to be measured can, therefore, be done remotely. The on site computer is provided with facsimile format capability so that stored data automatically can be communicated from the test site, through a telephone line, to a facsimile machine at the remote facility. Accordingly, it is unnecessary to dispatch service personnel to perform on site protocol analysis.

In accordance with another aspect of the invention, the system can be remotely conditioned to detect a predefined event in the selected line and, in response to such detection, perform a specified function. The event may be recognition of a faulty circuit and the function may be to disable the circuit upon recognition of the fault. Alternatively, the event may be a particular data string combination occurring in the monitored data stream and the function may be the immediate transmission of this information to the remote facility. Accordingly, conventional analysis operation can be expanded to serve an engineering operation in the former example and a watchdog operation in the latter example.

Additional objects and advantages of the present invention will become readily apparent to those skilled in this art from the following detailed description, wherein only the preferred embodiment of the invention is shown and described, simply by way of illustration of the best mode contemplated of carrying out the invention. As will be realized, the invention is capable of other and different embodiments, and its several details are capable of modifications in various obvious respects, all without departing from the invention. Accordingly, the drawings and description are to be regarded as illustrative in nature, and not as restrictive.

BEST MODE FOR CARRYING OUT THE INVENTION

In the present invention an analyzer unit is placed at the test site. The user can dial into the unit from any location to remotely access the system and select circuits which it is desired to monitor. Data can be continuously monitored and stored locally and remotely. Monitored data can be captured and buffered with subsequent performance of protocol analysis, the analysis data also being stored. Stored data can be transmitted to a remote location.

Figure 1:
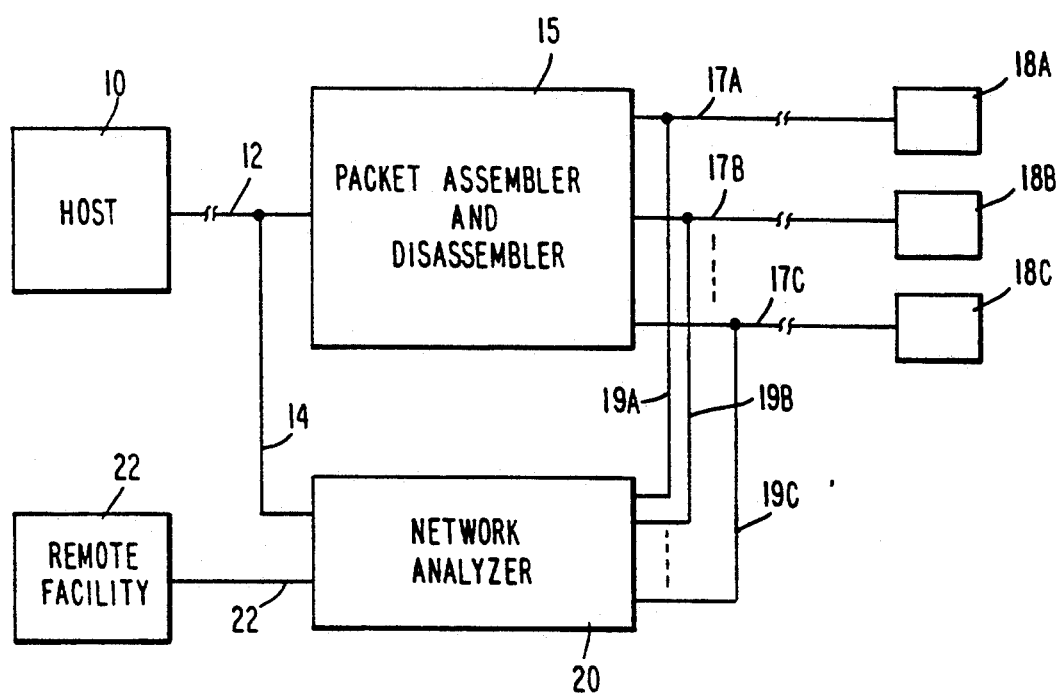
FIG. 1 is a simplified diagram of a multiple circuit private data network provided with on site protocol analysis with telephone dial out capability.

FIG. 1 shows, more specifically, the preferred arrangement. A host 10, which may be an operations center at a headquarters location, is connected to a private line data network by means of a high speed trunk line 12. Line 12 may include one or more individual lines such as commonly used T1, X.25 or X.75 lines. The trunk line is connected to packet assembler and disassembler 15 (PAD) at a remote site. The PAD reroutes packets of data from the trunk line data stream to a plurality of ports to individual data circuits, shown as 18A through 18C, via lines 17A through 17C. While three circuits are represented in the figure, in practice the PAD can handle up to five hundred twelve circuits or more. The system can handle optic fiber lines with appropriate interfacing.

A network analyzer 20 is located at the remote site in close proximity to the PAD and connected in parallel therewith through appropriate interfaces, such as RS232 or V.35 interfaces. Connection to the high speed data link is made by line 14. Lines 19A through 19C represent connections to the data circuits. This connection arrangement makes it possible to monitor any of the circuits at any time. The analyzer is connected to telephone line 22 which enables communication with a distant facility. Such feature affords capability of remote supervision and immediate communication of data from the analyzer to the facility at any time.

Figure 2:
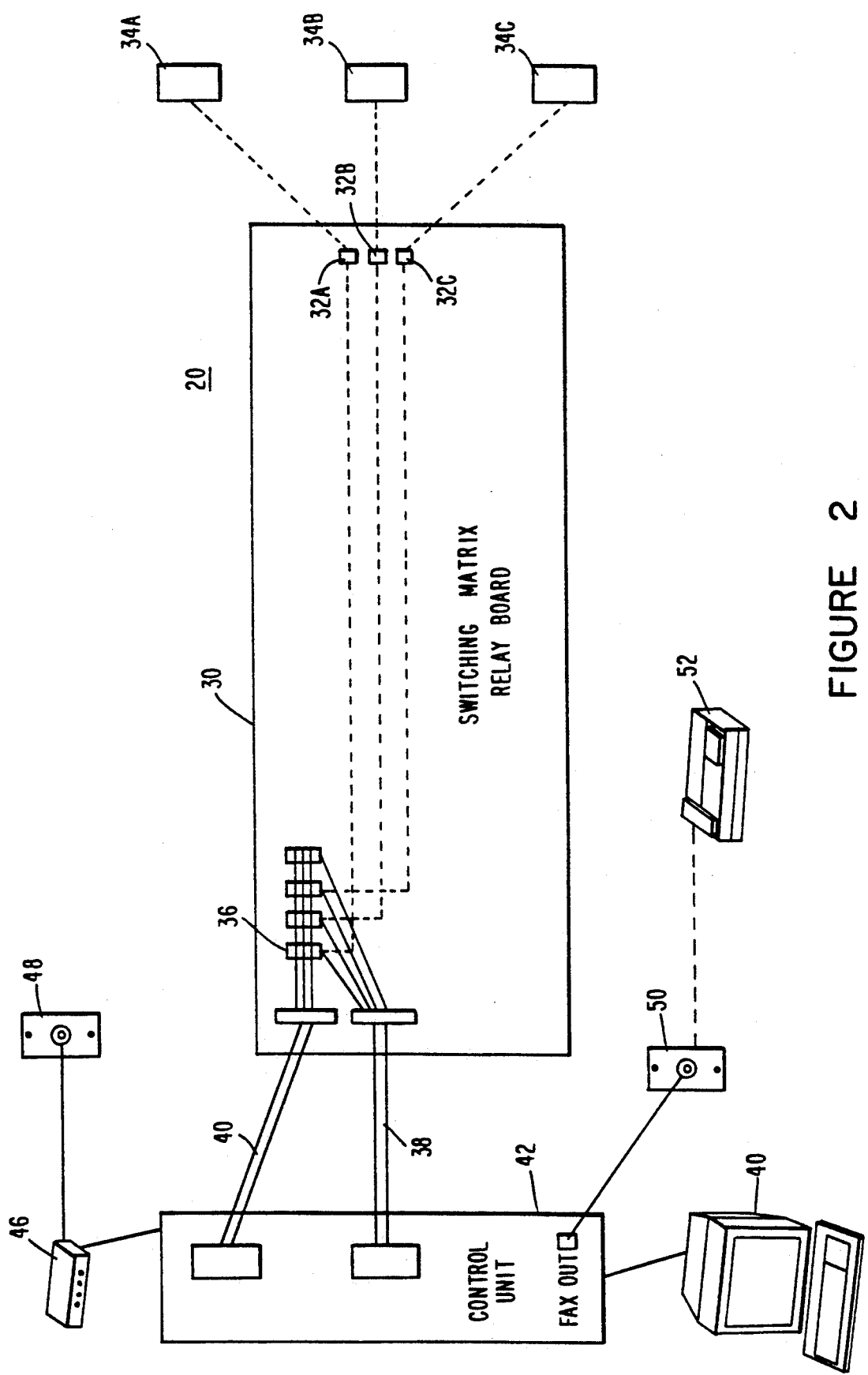
FIG. 2 is a simplified circuit diagram of the protocol analyzer unit.

The network analyzer unit 20 is shown in more detail in FIG. 2. A switching matrix relay board 30 is shown having input ports 32A through 32C. Connections are made to the input ports from the trunk lines and data circuits through appropriate interfaces shown as blocks 34A through 34C. The interfaces may be, for example, RS232, V.35 and T1. Only three of such inputs are shown for the sake of simplicity. Each of the input ports is connected to a corresponding switched relay connection 36 provided on the board. Each relay is controlled in accordance with a signal from switched relay control bus 38. Activated relays effect connection between the associated input and monitor bus 40.

Control unit 42 comprises protocol and network analyzer circuitry under control of a programmed computer. While the system is intended primarily for remote operation, display and keyboard 44 are provided for on site control. Buses 38 and 40 are connected to control unit 42. The control unit interacts with a remote computer through modem 46 and telephone line access 48. The control unit includes facsimile output capability whereby data can be transmitted to remote facsimile machine 52 through telephone line access 50. Reference is made to copending application, Ser. No. 07/515,007, filed Apr. 26, 1990, for a more detailed description of facsimile dial out capability. Data also can be transmitted back to the host through one of the channels of the trunk line. Such transmissions can be scheduled remotely to automatically take place after data has been stored.

The control unit is thus a p.c. based protocol analyzer that allows remote access to multiple ports for protocol monitoring and performance analyzation. In response to remote signal commands received through modem 46, the control unit outputs signals through selecting relay control bus 38 to activate the appropriate relays 36. Selected lines are then monitored through the activated relays and monitor bus 40 by the control unit.

The system allows remote monitoring and data capture of OSI layers 2 and 3 in plain English decode. User definable filtering enables the user to locate system troubles fast without being burdened by unwanted data. Precapture filters can include or exclude frames based on matching character strings or Layer 2 and 3 mnemonics. Specification can be made of type of frame, address, logical channel number or other characteristics.

Playback display of captured data can be filtered in the same manner. Frames can be reviewed by addresses, frame type or other characteristics. For prolonged data monitoring sessions, the filter can be enabled before data collection to eliminate unwanted data. Alternatively, for more detailed investigation, the filter would be enabled after data capture.

The analyzer has the ability to monitor key data line parameters of network performance. The data can be used by the analyzer to produce histograms, pie charts and line graphs to provide a dynamic picture of data line utilization and transaction response times. Time-lapse playback gives a quick overview of past events. With such material, the user can rapidly recognize overloaded circuits and equipment as well as underused capacity. More specifically, parameters which are analyzed include line utilization; effective baud rate; average total response time; average host resident time; highest response time, with time and date of occurrence; response time histograms with user definable intervals; total number of transactions; over-threshold transactions: date, time of day, total response time, terminal address and transaction ID; rejects with date, time of day, and node address; and average poll list wrap time. The appropriate software for these functions resides in storage in the analyzer computer.

Figure 3:
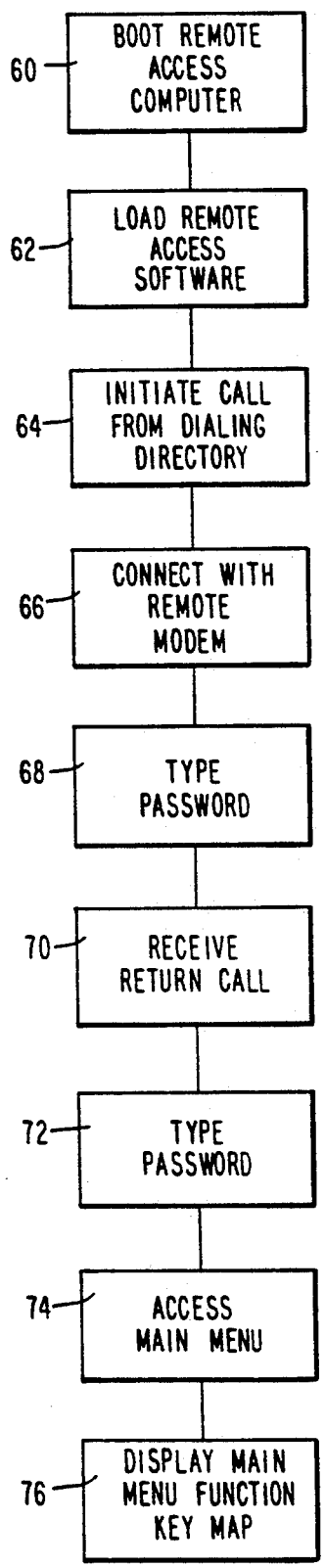
FIG. 3 is a flow chart showing remote accessing of the network analyzer.

FIG. 3 is a flow chart illustrating the manner in which the analyzer computer is remotely accessed. Both the originating computer and the analyzer computer contain master-slave communications software, such as pcAnywhere (TM), manufactured by Dynamic Microprocessor Associates, Inc. Such software enables an operator of the originating computer to control, through keyboard input, operations at the analyzer and obtain a display which simulates the display at the site. Reference is made to copending application, Ser. No. 07/394,090, filed Aug. 15, 1989, for a more detailed description.

The system is provided with a security call back procedure to prevent unauthorized use. The remotely accessed computer is booted as shown at 60 and software is loaded at 62. The analyzer unit may be accessed by dialing into the test center from any remote location. A call is initiated from a dialing directory 64 and connection is made to the remote modem 66. The user then types in a password. The test center computer has stored passwords and corresponding telephone numbers previously entered on site and which are not remotely changeable. If the typed password validly matches the stored password a return call is made to the preprogrammed telephone number which corresponds to the password. Since the return call determines control of the testing, and this call has been made to a preprogrammed telephone number, an unauthorized user, even one who discovers the password, cannot gain control.

Upon receipt of the return call 70, the password is again entered at 72 and the main menu is accessed, 74, and displayed, 76. The main menu offers various function control options, some of which being illustrated in a function kep map in FIG. 5.

Figure 4:
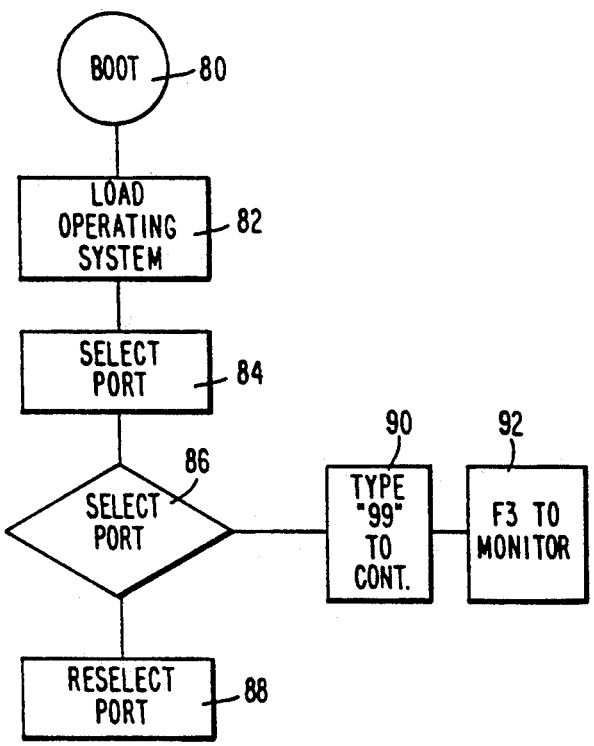
FIG. 4 is a flow chart indicating circuit selection and monitoring functions.

FIG. 4 depicts a flow chart of the analyzer operation in port selection for a specified circuit to be tested. The analyzer computer is booted, 80, and the operating system loaded, 82. A port selection, 84, is made remotely by the user, who merely types in a number which corresponds to the circuit number appearing on a chart. If selection is incorrect reselection is made, 88. If the selection is correct, an appropriate entry is made, 90, after which the function key F3 may be entered to monitor.

Figure 5:
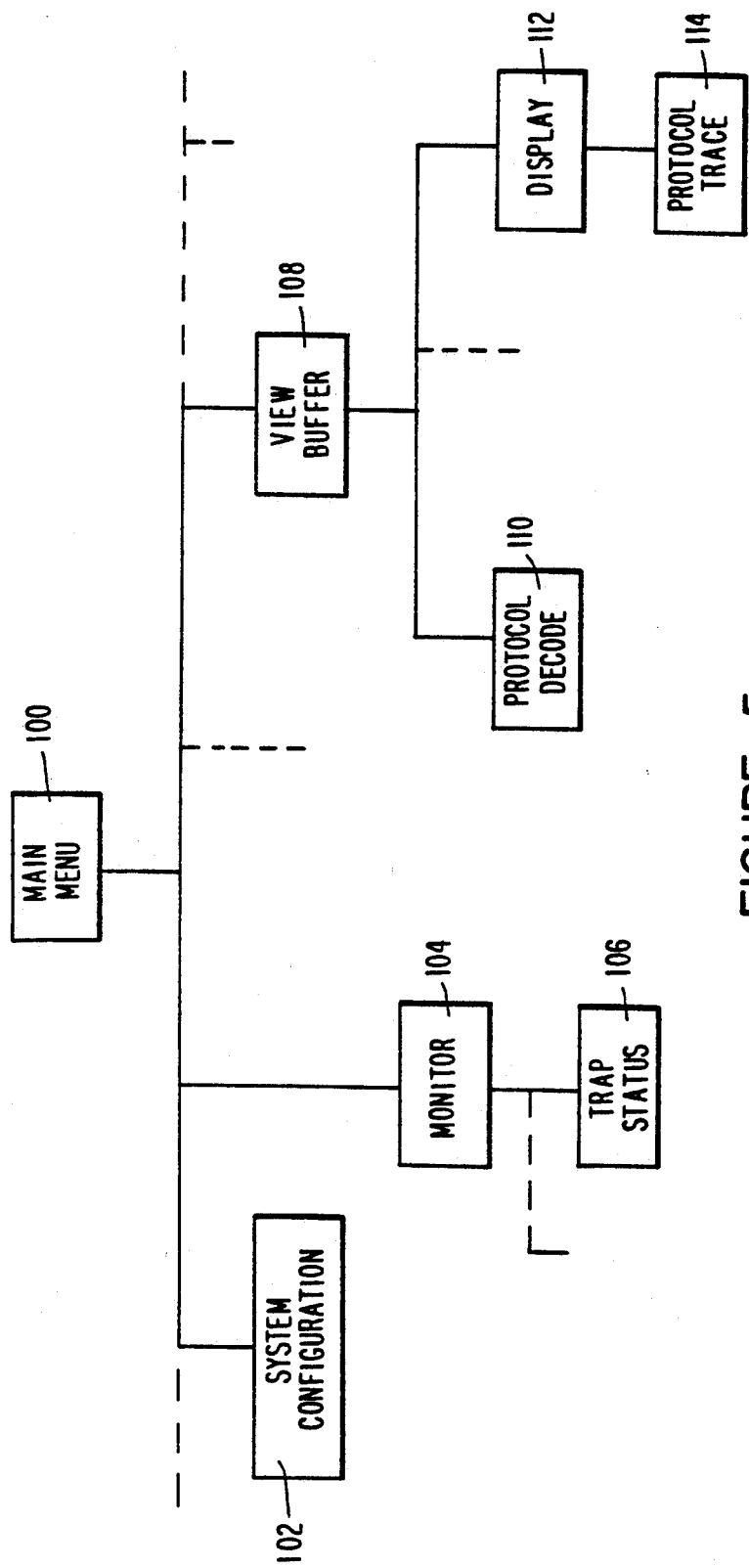
FIG. 5 is a partial function key map for program operations at the analyzer site.

It is to be understood that this function is only one of the many that have been described and are similarly capable of flow chart illustration. FIG. 5 partially shows a function key map of additional functions including system configuration, 102, monitor, 104, and view buffer, 108. A monitored data string can be trapped, 106, and the display, 112, can provide a protocol trace, 114.

It is also possible that the user, instead of being provided with a keyboard and display monitor, may use a videophone for interfacing with the system. The menu may be displayed on the videophone and selections may be made by touchtone depression instead of keyboard entry.

In summary, the invention provides a complete system including a protocol analyzer and a switch access system which are remotely controllable. The system is remotely controllable, can perform network analysis and automatically sends output back in facsimile format. The system can be programmed to ignore data until a certain event occurs. For example, the system can look for log in of a specified user. Use of an unauthorized ATM card, for example, can be detected and an alarm sent to the host location.

In this disclosure there is shown and described only the preferred embodiment of the invention and but a few examples of its versatility. It is to be understood that the invention is capable of use in various other combinations and environments and is capable of changes or modifications within the scope of the inventive concept as expressed herein.

What is claimed is:

1. A method of remote testing and analysis of a plurality of communication lines concentrated at a first location comprising
   establishing a first telephone communication between said first location and a facility distant from said first location;
   transmitting a command, issued at said facility, through said telephone communication to said first location;
   performing nonintrusive protocol analysis of a selected line at said first location in response to receipt of said command;
   automatically intitiating, at said first location, a second telephone communication with said facility; and
   transmitting results of nonintrusive said protocol analysis by means of said second telephone communication to said facility.

2. A method of remote testing and analysis as recited in claim 1, wherein said results are transmitted in facsimile format for receipt by a transimile machine at said facility.

3. A method of remote testing and analysis as recited in claim 1, wherein said nonintrusive protocol analysis includes data link protocol analysis.

4. A method of remote testing and analysis as recited in claim 1, wherein said nonintrusive protocol analysis includes network analysis.

5. A method of remote testing and analysis as recited in claim 1, wherein performing said nonintrusive protocol analysis comprises monitoring a data stream transmitted on said selected line; and detecting the occurrence of a predefined event;

wherein said second telephone communication is initiated in response to detection of said predefined event.

6. A method of remote testing and analysis as recited in claim 5, wherein said predefined event comprises a specified data string combination.

7. A method of remote testing and analysis as recited in claim 5, wherein said predefined event comprises the activation of a specified communication line.

8. A method of remote testing and analysis as recited in claim 5 wherein said predefined event comprises a particular defect in any one of the communication lines.

9. A method of remote testing and analysis as recited in claim 8, further comprising automatically disabling a communication line in response to detection of said particular defect.

10. In a private line data network including a high speed trunk line connected to a host at a first location and a plurality of data circuits at a second location, a system for remote access and protocol analysis of the data circuits comprising:

control means at said second location, responsive to remote user commands, said control means comprising:

selecting means for automatically selecting, in response to a remote command, a data circuit;

switching means at said second location for accessing selected ones of said data circuits;

input means for nonintrusively supplying data corresponding to data transmitted on said high speed trunk line and on said selected data circuit to said control means;

analysis means for performing protocol analysis of input data supplied by said input means;

storage means for storing input data and analysis data; and transmission means for transmitting selected stored data to a designated external location.

11. A system as recited in claim 10, wherein said transmission means comprises output means for converting said selected stored data to facsimile format.

12. A system as recited in claim 11, wherein said transmission means further comprises direct distance dialing means for transmitting facsimile formatted output to a remotely located facsimile machine at said external location.

13. A system as recited in claim 10, wherein said high speed trunk line comprises a plurality of communication channels, one of said channels allocated for transmission of said selected stored data to said host location.

14. A system as recited in claim 10, wherein said control means comprises a programmed computer.

15. A system as recited in claim 14, wherein said remote user commands are received from a direct distance dialing telephone line.

16. A system as recited in claim 15, wherein said control means further comprises security means for gaining access to said direct distance dialing telephone line through call back security procedure.

17. A system as recited in claim 14, wherein said protocol analysis includes data link protocol analysis.

18. A system as recited in claim 14, wherein said protocol analysis includes network analysis.

19. In a private line data network including a high speed trunk line connected to a host at a first location and connected to a plurality of data circuits by switching relays at a second location, a method for remote and unattended protocol analysis comprising the steps of:

transmitting a remote command to said second location;

selecting a data circuit, in response to said remote command;

nonintrusively supplying data corresponding to data transmitted on said high speed trunk line and said selected data circuit;

performing protocol analysis of monitored data;

storing supplied data and analysis data; and transmitting selected stored data to a designated external location.

20. A method as recited in claim 19, wherein said data transmitting step comprises converting said selected data to facsimile format.

21. A method as recited in claim 20, wherein said data transmitting step further comprises direct distance dialing to a remote facsimile machine at said external location.

22. A method as recited in claim 19, wherein said data transmitting step comprises transmitting said selected stored data to the host through a channel of said high speed trunk line.

23. A method as recited in claim 19, wherein said command transmitting step comprises applying remote user commands to said second location from a direct distance dialing telephone line.

24. A method as recited in claim 23, wherein said command transmitting step further comprises a call back security procedure for gaining remote access control of said second location comprising the steps of initiating a remote direct distance dialing telephone call to said second location;

supplying a password during said telephone call; and initiating a direct distance dialing telephone call from said second location to a stored predefined telephone number address corresponding to said password.

25. A method as recited in claim 19, wherein said protocol analysis includes data link protocol analysis.

26. A method as recited in claim 19, wherein said protocol analysis includes network analysis.

27. A method as recited in claim 19, further comprising the steps of detecting the occurrence of a predefined event and, in response thereto, initiating a telephone call to a predetermined telephone number address.

28. A method as recited in claim 27, wherein said predefined event comprises a specified data string combination in a monitored data stream.

29. A method as recited in claim 28, further comprising capturing said data string combination and initiating a control function at a remote location.

30. A method as recited in claim 27, wherein said predefined event comprises the activation of a specified data circuit.

31. A method as recited in claim 27, wherein said predefined event comprises the occurrence of a particular defect in the data network.

32. A method as recited in claim 31, wherein said defect is a faulty data circuit and said method further comprises disabling said faulty data circuit.

\* \* \* \* \*